(12) United States Patent
Liao

(10) Patent No.: US 9,713,821 B2
(45) Date of Patent: Jul. 25, 2017

(54) COATING DEVICE

(71) Applicant: Eric Liao, Taichung (TW)

(72) Inventor: Eric Liao, Taichung (TW)

(*) Notice: Subject to any disclaimer, the term of this patent is extended or adjusted under 35 U.S.C. 154(b) by 0 days.

(21) Appl. No.: 15/072,338

(22) Filed: Mar. 16, 2016

(65) Prior Publication Data
US 2017/0128974 A1 May 11, 2017

(30) Foreign Application Priority Data

Nov. 5, 2015 (TW) .............................. 104136423 A

(51) Int. Cl.
| | |
|---|---|
| *B05C 5/02* | (2006.01) |
| *B29C 47/00* | (2006.01) |
| *B05C 17/005* | (2006.01) |
| *B29C 47/02* | (2006.01) |

(52) U.S. Cl.
CPC ............ *B05C 5/027* (2013.01); *B05C 5/0254* (2013.01); *B05C 5/0291* (2013.01); *B05C 17/005* (2013.01); *B29C 47/0019* (2013.01); *B29C 47/026* (2013.01)

(58) Field of Classification Search
CPC ..... B05C 17/005; B05C 5/027; B05C 5/0254; B05C 5/0291; B29C 47/026; B29C 47/0019; B29C 47/0883; A22C 7/00

USPC ........ 118/300, 410, 313, 315; 425/188, 190, 425/225; 239/600; 222/567
See application file for complete search history.

(56) References Cited

U.S. PATENT DOCUMENTS 4,233,018 A * 11/1980 Chinfen .................... A22C 7/00
425/188

FOREIGN PATENT DOCUMENTS

GB                832710    *  4/1960    ............... A22C 7/00

* cited by examiner

*Primary Examiner* — Laura Edwards
(74) *Attorney, Agent, or Firm* — Bruce Stone LLP; Joseph Bruce

(57) ABSTRACT

A coating device provided for connection to a discharge pipe of a coating container, includes a guide base and a cover. The cover is pivoted to the connecting end of the guide base, so that the cover can cover the guide section of the guide base to close the coating device, and can also be pivoted with respect to the guide base to open the coating device, which makes it convenient for the user to take out the residue of coating material from the guide space, so that the coating device can be used repeatedly. Furthermore, the coating material is guided by the guide ribs and the cover ribs to flow evenly to each of the discharge holes, which ensures even distribution of the coating material from the coating device.

7 Claims, 6 Drawing Sheets

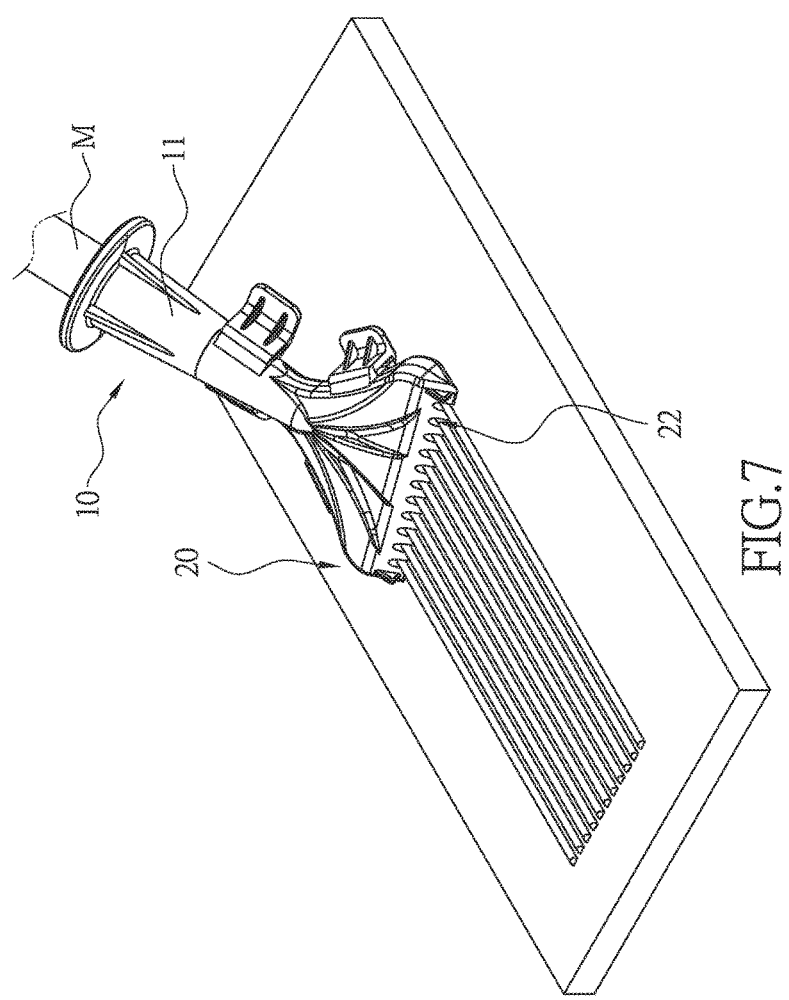

COATING DEVICE

BACKGROUND

Cross Reference to Related Application

This application claims the benefit of priority to TW 104136423, filed on Nov. 5, 2015 with the Intellectual Property Office of the Republic of China, Taiwan, the entire specification of which is incorporated herein by reference.

Field of the Invention

The present invention relates to a coating device, and more particularly to a coating device which is provided for connection to a coating container and can be used repeatedly.

Related Prior Art

To apply the coating material evenly to a surface, the conventional method is to squeeze the coating onto the surface and then rub the coating with a scraper until the coating is level with the surface. However, the coating application process is very complication, and the coating squeezing process and the coating rubbing process cannot be carried out synchronously at one time. Therefore, a coating device was invented, as shown in FIG. 1, and comprises: a feeding pipe portion 80 which communicates with one end of a discharge head portion 90, and another end of the discharge head portion 90 is provided with a plurality of discharge apertures 91. The coating device is connected to a discharge end of a coating container.

The coating material is moved from the discharge end of the coating container through the feeding pipe portion 80 into the discharge head portion 90, and finally discharged out of the discharge apertures 91.

However, a large amount of coating material will be left in the discharge head portion 90 after use, and is difficult to clean. If the coating is in gel form, it will be cured in the discharge head portion 90, and as a result, the discharge head portion 90 can not be used again.

Besides, during coating application, the discharge apertures 91 close to the center of the discharge head portion 90 will discharge more coating than other discharge apertures 91 located at both ends thereof, so that the coating is applied in an uneven manner.

The present invention has arisen to mitigate and/or obviate the afore-described disadvantages.

SUMMARY

The present invention is aimed at providing a coating device which can be used repeatedly.

The present invention is further aimed at providing a coating device which allows for even distribution of coating material.

Therefore, a coating device being provided for connection to a discharge pipe of a coating container, and comprises:

a guide base including a neck section, and a guide section with a first end connected to the neck section, wherein a second end of the guide section is a connecting end, a diameter of the guide section increases from the first end toward the connecting end, the guide section includes a guide recess, two stop walls being disposed at two opposite sides of the guide recess and each including at least one engaging protrusion; and a cover including a discharge end to be pivoted to the connecting end of the guide base, wherein the cover is able to cover the guide section of the guide base to close the coating device, and also able to pivot with respect to the guide base to open the coating device, the discharge end being provided with a plurality of discharge holes, the cover further including a cover recess, when the coating device is closed, a guide space which communicates with the discharge holes is formed between the guide recess and the cover recess, the cover is provided at two sides thereof with at least one retaining portion, when the coating device is closed, the engaging protrusions are engaged with the retaining portions, so as to fix the cover to the guide base.

Preferably, the guide recess includes a guide surface which is provided with a plurality of guide ribs, the cover recess includes a cover surface, when the coating device is closed, the cover surface is located toward the guide surface, and the cover surface includes a plurality of cover ribs which are located in alignment with the guide ribs.

It can be learned from the above description that the cover is pivoted to the connecting end of the guide base, so that the cover can cover the guide section of the guide base to close the coating device, and can also be pivoted with respect to the guide base to open the coating device, which makes it convenient for the user to take out the residue of coating material from the guide space, so that the coating device can be used repeatedly.

Furthermore, the coating material is guided by the guide ribs and the cover ribs to flow evenly to each of the discharge holes, which ensures even distribution of the coating material from the coating device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

FIG. 7 is an operational view of the coating device in accordance with the preferred embodiment of the present invention.

DETAILED DESCRIPTION

Figure 1:
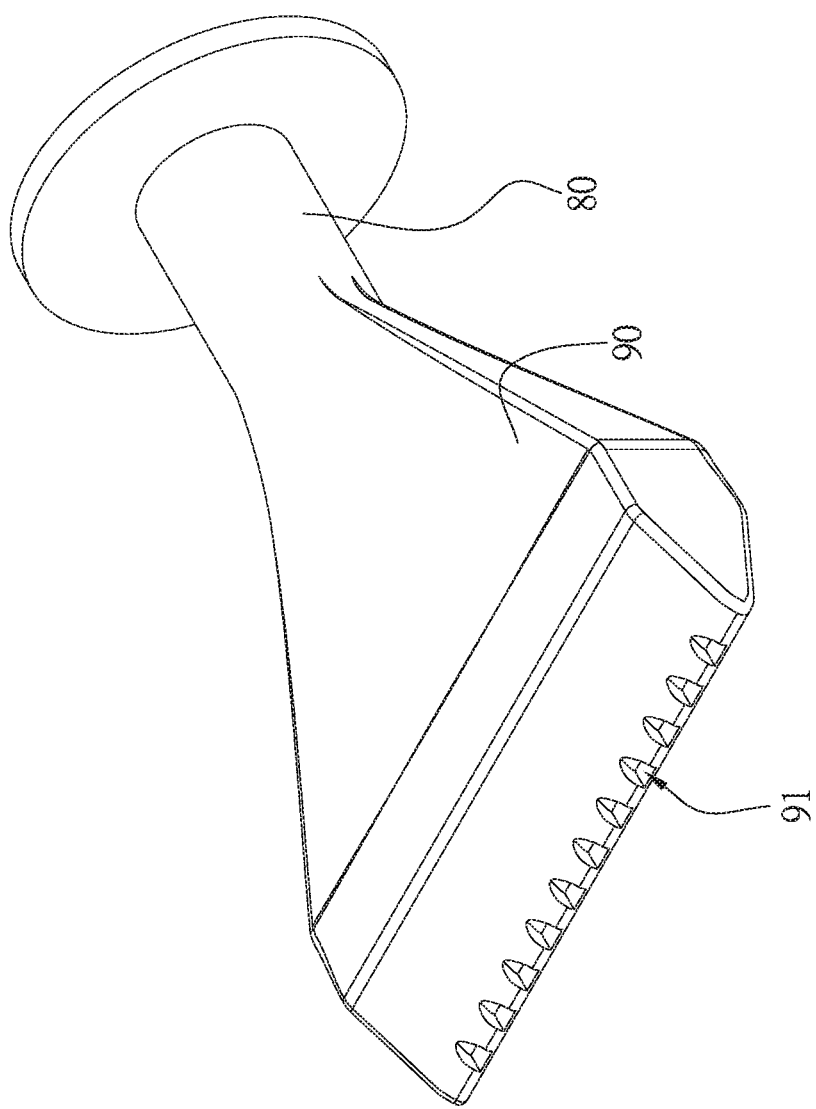
FIG. 1 shows a conventional coating device.
Figure 2:
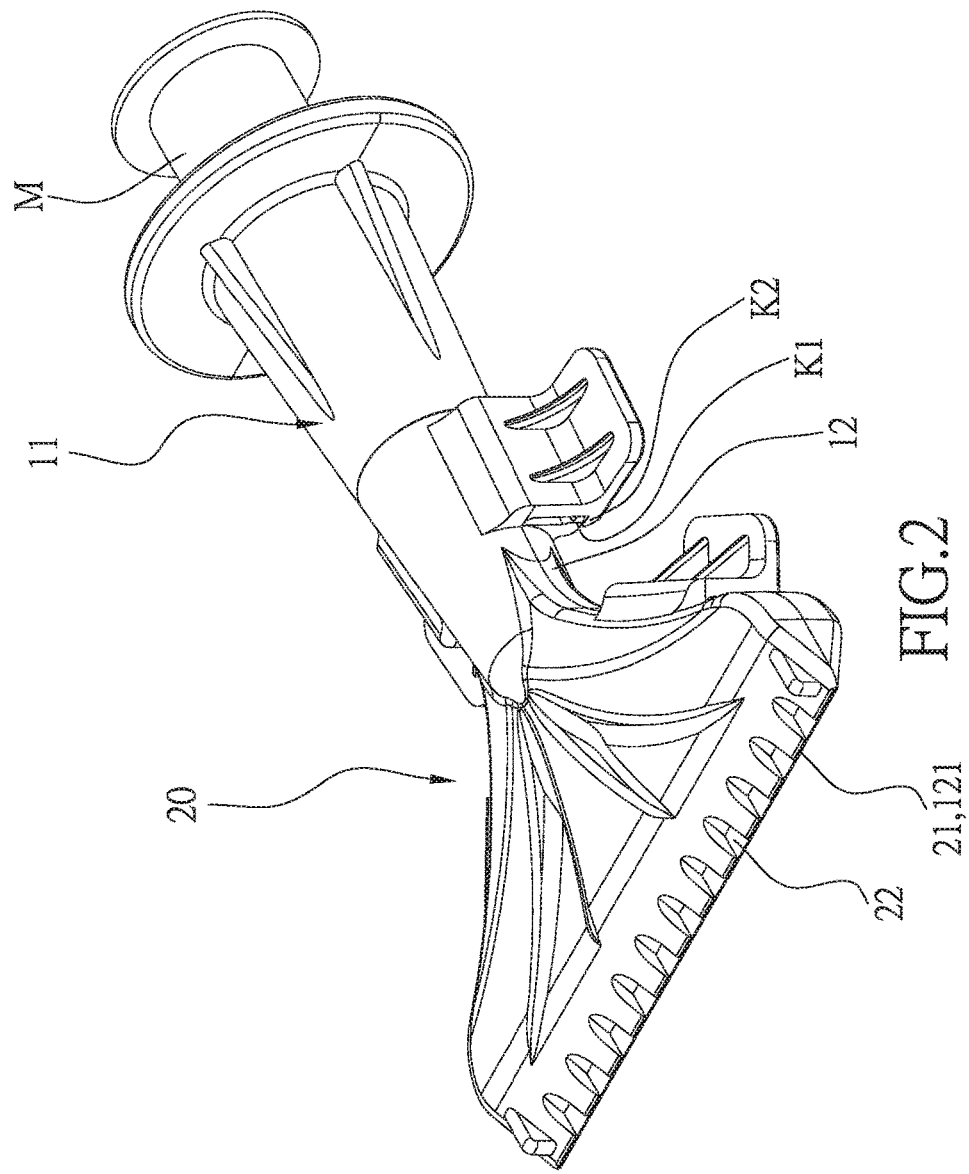
FIG. 2 is a perspective view of the coating device in accordance with the preferred embodiment of the present invention.
Figure 3:
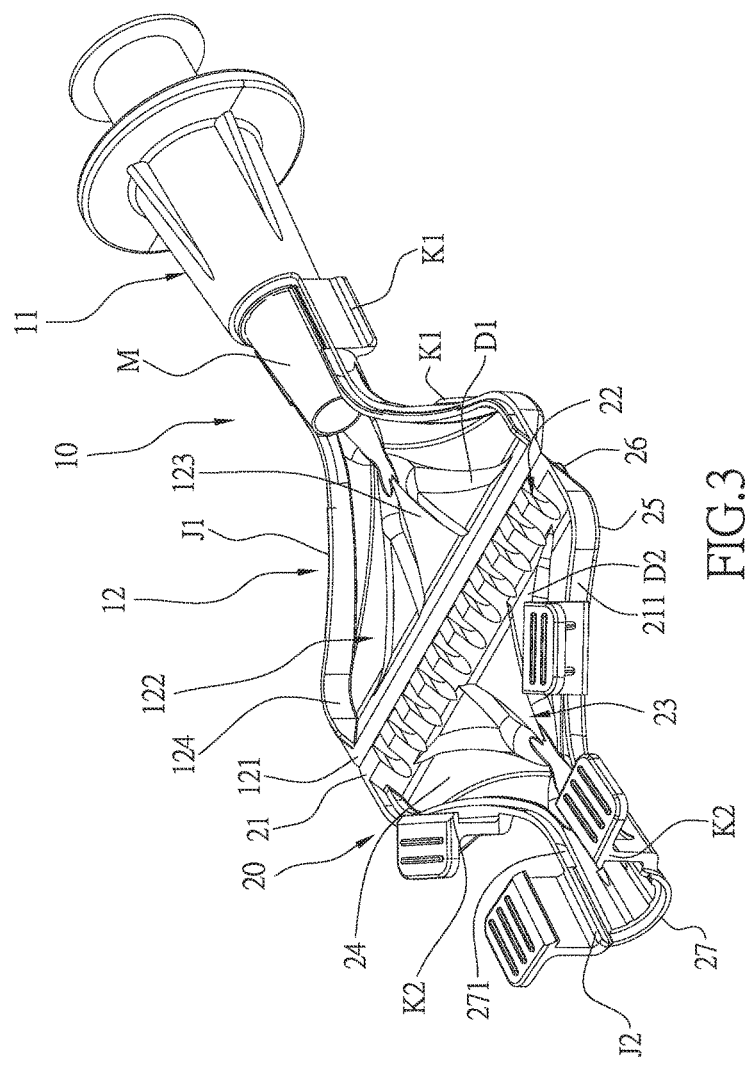
FIG. 3 is another perspective view of the coating device in accordance with the preferred embodiment of the present invention.

The present invention will be clearer from the following description when viewed together with the accompanying drawings, which show, for purpose of illustrations only, the preferred embodiment in accordance with the present invention.

Referring to FIGS. 2-7, a coating device in accordance with the preferred embodiment of the present invention is provided for connection to a discharge pipe M of a coating container, and comprises: a guide base 10 and a cover 20.

The guide base 10 includes a neck section 11, and a guide section 12 with a first end connected to the neck section 11. The neck section 11 is a conical structure with an inner hole for insertion of the discharge pipe M. A second end of the guide section 12 is a connecting end 121, and the diameter of the guide section 12 gradually increases from the first end toward the connecting end 121. The guide section 12 includes a guide recess 122 which includes a guide surface 123 which is provided with a plurality of guide ribs D1. Two stop walls 124 are disposed at two opposite sides of the guide recess 122, and each include a hook portion J1 and at least one engaging protrusion K1.

Figure 4:
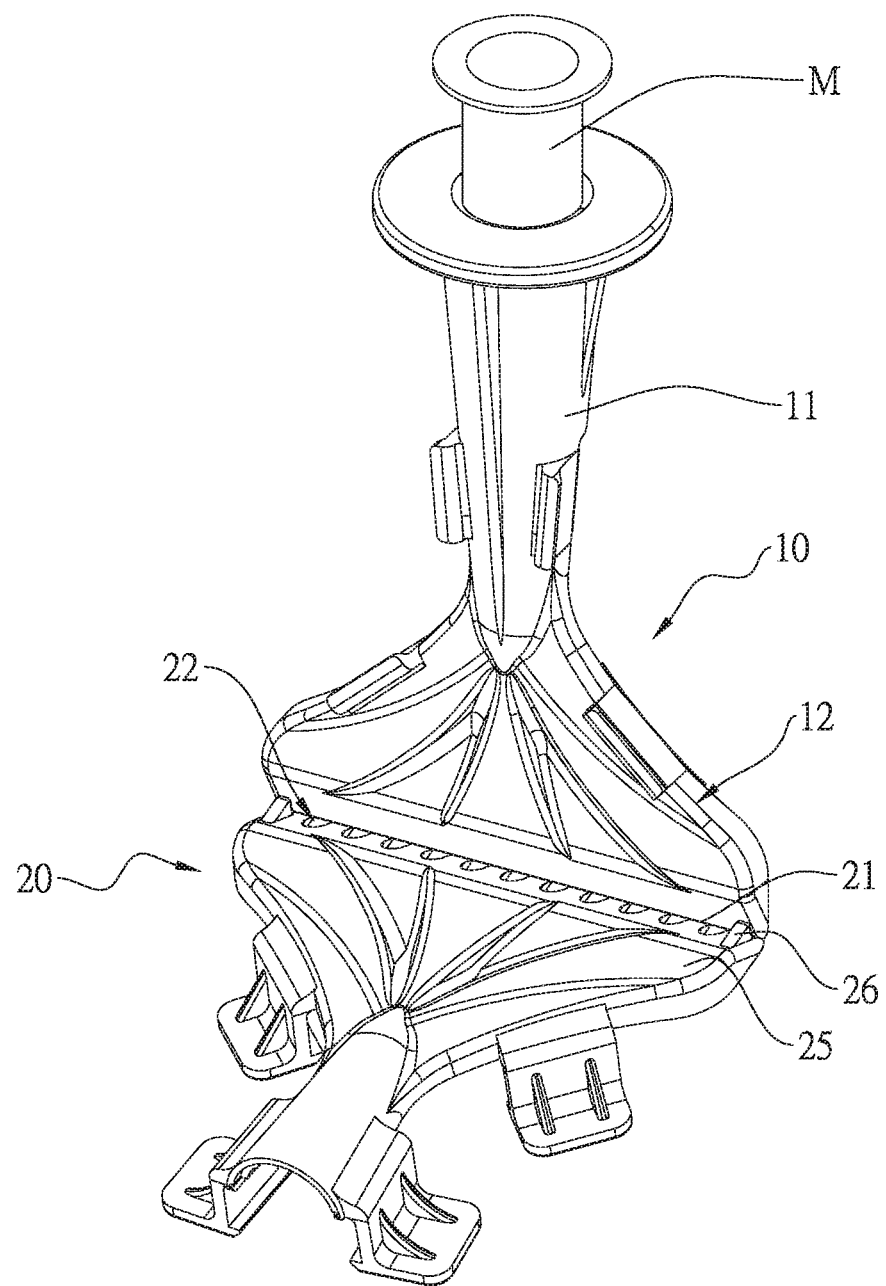
FIG. 4 is a perspective view from another angle of the coating device in accordance with the preferred embodiment of the present invention.
Figure 5:
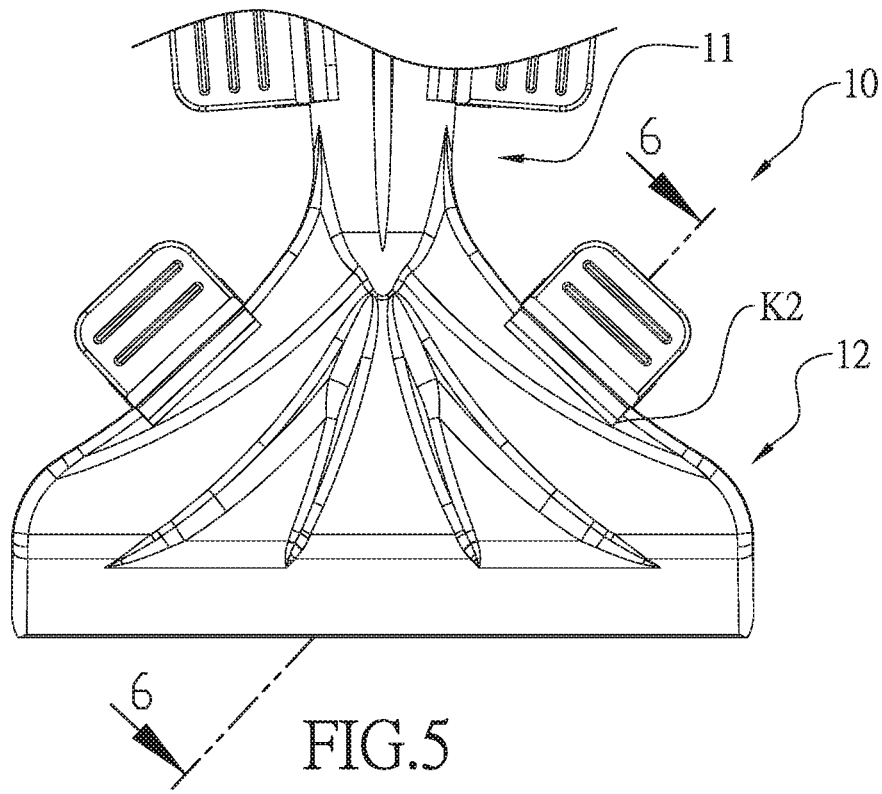
FIG. 5 is an illustrative view of the coating device in accordance with the preferred embodiment of the present invention.
Figure 6:
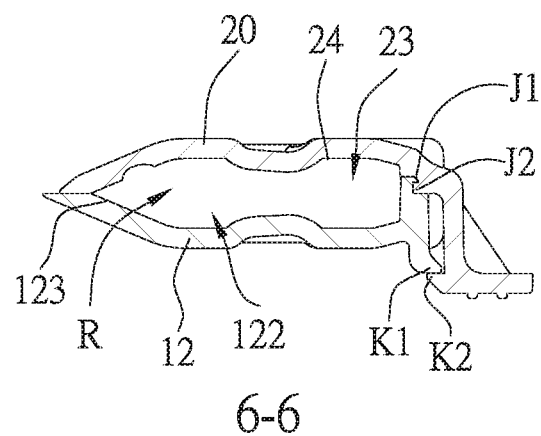
FIG. 6 is a cross sectional view of the coating device in accordance with the preferred embodiment of the present invention.

The cover 20 includes a discharge end 21 to be pivoted to the connecting end 121 of the guide base 10. The cover 20 can cover the guide section 12 of the guide base 10 to close the coating device, and can also be pivoted with respect to the guide base 10 to open the coating device. The discharge end 21 is provided with a plurality of discharge holes 22 which are equidistantly spaced apart. The cover 20 further includes a cover recess 23, a cover surface 24 formed in the cover recess 23, and a restricting surface 25 opposite the cover surface 24. When the coating device is closed, the cover surface 24 is located toward the guide surface 123. The cover surface 24 includes a plurality of cover ribs D2 which are located in alignment with the guide ribs D1. When the coating device is closed, a guide space R which communicates with the discharge holes 22 will be formed between the guide recess 122 and the cover recess 23. The cover 20 is provided at two sides with at least one hook portion J2, and at least one retaining portion K2, and the hook portions J2 are located at two sides of the cover surface 24, as shown in FIG. 6. When the coating device is closed, the engaging protrusions K1 are engaged with the retaining portions K2, so as to fix the cover 20 to the guide base 10. Meanwhile, the hook portions J1 are hooked to the hook portions J2 to prevent leakage of coating material. As shown in FIG. 4, the restricting surface 25 of the cover 20 is provided with at least one stop portion 26 which is located at the discharge end 21. In this embodiment, there are two stop portions 26 which are located at two sides of the discharge end 21 to restrict the pivot angle of the cover 20, which prevents excessive rotation angle of the cover 20, consequently preventing the connection between the cover 20 and the guide base 10 from breaking up. Preferably, the cover 20 is formed to fit the shape of the guide section 12 of the guide base 10. An opposite end of the cover 20 to the discharge end 21 is a feeding end 27 which is narrower than the discharge end 21. The cover 20 further includes a discharge section 211 connected to the discharge end 21, and a feeding section 271 connected to the feeding end 27. There are four retaining portions K2, which are arranged at two sides of the discharge section 211 and the feeding section 271. When the coating device is closed, the retaining portions K2 are aligned to the engaging protrusions K1.

When in use and the coating device is closed, a user presses the coating container to make the coating material flow through the discharge pipe M to the guide space R, and then the coating material is guided by the guide ribs D1 and the cover ribs D2 to flow evenly to each of the discharge holes 22, so that the coating material can be discharged in an even manner. After use, the just needs to release the hook portions J1 from the hook portions J2, and rotates the cover 20 with respect to the guide base 10 to open the coating device, so that the user can remove the residue of coating material from the guide space R. After removal of the residue of coating material, the user can rotate the cover 20 in a reverse direction until the hook portions J1, J2 are hooked together, so that the coating device is closed and can be used repeatedly.

It can be learned from the above description that the cover 20 is pivoted to the connecting end 121 of the guide base 10, so that the cover 20 can cover the guide section 12 of the guide base 10 to close the coating device, and can also be pivoted with respect to the guide base 10 to open the coating device, which makes it convenient for the user to take out the residue of coating material from the guide space R, so that the coating device can be used repeatedly.

Furthermore, the coating material is guided by the guide ribs D1 and the cover ribs D2 to flow evenly to each of the discharge holes 22, which ensures even distribution of the coating material from the coating device.

While we have shown and described various embodiments in accordance with the present invention, it is clear to those skilled in the art that further embodiments may be made without departing from the scope of the present invention.

What is claimed is:

1. A coating device being provided for connection to a discharge pipe of a coating container, and comprising:
    a guide base including a neck section, and a guide section with a first end connected to the neck section, wherein a second end of the guide section is a connecting end, a diameter of the guide section increases from the first end toward the connecting end, the guide section includes a guide recess, two stop walls being disposed at two opposite sides of the guide recess and each including at least one engaging protrusion; and
    a cover including a discharge end to be pivoted to the connecting end of the guide base, wherein the cover is able to cover the guide section of the guide base to close the coating device, and also able to pivot with respect to the guide base to open the coating device, the discharge end being provided with a plurality of discharge holes, the cover further including a cover recess, when the coating device is closed, a guide space which communicates with the discharge holes is formed between the guide recess and the cover recess, the cover is provided at two sides thereof with at least one retaining portion, when the coating device is closed, the engaging protrusions are engaged with the retaining portions, so as to fix the cover to the guide base;
    wherein the guide recess includes a guide surface which is provided with a plurality of guide ribs, the cover recess includes a cover surface, when the coating device is closed, the cover surface is located toward the guide surface, the cover surface includes a plurality of cover ribs which are located in alignment with the guide ribs to guide flow of liquid coating material to the discharge holes.

2. The coating device as claimed in claim 1, wherein the neck section is a conical structure with an inner hole.

3. The coating device as claimed in claim 1, wherein the discharge holes are equidistantly spaced apart from one another.

4. The coating device as claimed in claim 1, wherein the two stop walls each include a hook portion, the cover is provided at two sides thereof with at least one hook portion to be hooked to the hook portion of the stop walls.

5. The coating device as claimed in claim 1, wherein the cover is formed to fit the shape of the guide section of the base, an opposite end of the cover to the discharge end is a feeding end which is narrower than the discharge end, the cover further includes a discharge section connected to the discharge end, and a feeding section connected to the feeding end, there are four said retaining portions arranged at two sides of the discharge section and the feeding section, respectively, when the coating device is closed, the retaining portions are aligned to the engaging protrusions.

6. The coating device as claimed in claim 1, wherein the cover further includes a restricting surface opposite the cover surface, and the restricting surface of the cover is provided with at least one stop portion which is located at the discharge end.

7. The coating device as claimed in claim 6, wherein two said stop portions are located at two sides of the discharge end.

* * * * *